US010860540B1

(12) United States Patent
Ugur-Ozekinci

(10) Patent No.: US 10,860,540 B1
(45) Date of Patent: Dec. 8, 2020

(54) METHOD AND SYSTEM FOR SYNCHRONIZING BACKUP AND CLONING SCHEDULES

(71) Applicant: EMC IP Holding Company LLC, Hopkinton, MA (US)

(72) Inventor: Yasemin Ugur-Ozekinci, Oakville (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 177 days.

(21) Appl. No.: 13/905,806

(22) Filed: May 30, 2013

(51) Int. Cl.
*G06F 16/178* (2019.01)
*G06F 11/14* (2006.01)

(52) U.S. Cl.
CPC ........ *G06F 16/178* (2019.01); *G06F 11/1458* (2013.01)

(58) Field of Classification Search
CPC ............ G06F 11/1469; G06F 11/1458; G06F 11/1464; G06F 17/30292; G06F 2221/2135; G06F 11/1456; G06F 17/211; G06F 11/1435; G06F 11/2028; G06F 16/283; G06F 21/81; G06F 11/1453; G06F 16/178

See application file for complete search history.

(56) References Cited

U.S. PATENT DOCUMENTS

| | | | | |
|---|---|---|---|---|
| 8,538,919 B1 * | 9/2013 | Nielsen | ................ | G06F 9/5077 380/277 |
| 2005/0273476 A1 * | 12/2005 | Wertheimer et al. | ......... | 707/204 |
| 2007/0124130 A1 * | 5/2007 | Brunet et al. | ................... | 703/23 |
| 2007/0220308 A1 * | 9/2007 | Yeung | ................. | G06F 11/1469 714/5.1 |
| 2008/0244028 A1 * | 10/2008 | Le | .......... | G06F 3/0607 709/208 |
| 2009/0106327 A1 * | 4/2009 | Dilman et al. | ................ | 707/202 |
| 2009/0144341 A1 * | 6/2009 | Hauck | ................. | G06F 11/1464 |
| 2011/0082832 A1 * | 4/2011 | Vadali | ................. | G06F 11/1451 707/615 |
| 2013/0054531 A1 * | 2/2013 | Susairaj | .............. | G06F 11/2061 707/640 |
| 2013/0085999 A1 * | 4/2013 | Tung | ................... | G06F 11/1451 707/654 |
| 2014/0095817 A1 * | 4/2014 | Hsu | ..................... | G06F 11/1438 711/162 |
| 2014/0114921 A1 * | 4/2014 | Klimetschek | ..... | G06F 17/30212 707/638 |
| 2014/0149695 A1 * | 5/2014 | Zaslavsky | ........... | G06F 9/45558 711/162 |

* cited by examiner

Primary Examiner — Mariela Reyes
Assistant Examiner — Courtney Harmon
(74) Attorney, Agent, or Firm — Dergosits & Noah LLP; Todd A. Noah

(57) ABSTRACT

Synchronizing backup and cloning schedules is described. A determination is made whether any session is running disk backup. A determination is made whether a backup file is stored in a file recovery area if no session is running disk backup. A determination is made whether a successful clone copy was created of the backup file if the backup file is stored in the file recovery area. A clone copy of the backup file is created if the successful clone copy was created of the backup file. The clone copy is stored on an external destination node.

14 Claims, 3 Drawing Sheets

METHOD AND SYSTEM FOR SYNCHRONIZING BACKUP AND CLONING SCHEDULES

BACKGROUND

If a software error corrupts a database, or if erroneous data updates the database, a database administrator may restore the database to a previous uncorrupted state that does not include the corrupted or erroneous data. A backup application executes a backup operation either occasionally or continuously to enable this restoration, storing a copy of each desired database state (the values of its data and these values' embedding in the database's data structures) within dedicated backup files. When the database administrator decides to return the database to a previous state, the database administrator specifies the desired previous state by identifying a desired point in time when the database was in this state, and instructs the backup application to execute a restore operation to restore the database with a copy of the backup files corresponding to that state. An additional copy that is made of the copy of the backup files and stored separately from the backup files may be referred to as a clone copy of the backup files.

A relational database management system, such as Oracle®, SQL® database, IBM® DB2® database, or any other type of relational database, typically use the relational database management system's native backup and recovery tool to store a backup file to a file system directory (called a recovery area directory) on a disk, and then create and store a clone copy of the backup file using a one-step backup process or a two-step backup process. In the one-step backup process, a database administrator for the relational database management system and a backup administrator for a third-party backup application together create and store the clone copy of the backup file directly to a storage device that is external to the relational database management system. The third-party backup application typically has a plugin for the relational database management system. The relational database management system sends a clone copy of the backup file directly to the plugin using a well-defined application program interface, and in turn to the external storage device. In the two-step backup process, the database administrator uses the relational database management system's native backup and recovery tool to store the backup file to a file system directory on a disk without using any third-party backup application, and then requests the backup administrator to use the third-party backup application to store a clone copy of the backup file to the external storage device.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

When the two-step backup process is used to clone a copy of the backup file, a backup administrator has to correctly schedule when the third-party backup application should start creating a clone copy, based on when the relational database management system's native backup and recovery tool is done storing the backup file to the file system directory on a disk, such as every day at a specified time. This task may become tedious and failure prone for the backup administrator because the backup file may not be finished storing to disk by the specified time, or because the disk backup schedule may change, such as starting at 5 A.M. instead of 2 A.M. every night. Furthermore, the database administrator may perform an ad-hoc disk backup on different occasions, such as after a big data load to the database, or after an upgrade. In each of these examples, the third-party backup application does not create a clone copy of the backup file when the database administrator wants a clone copy created, because the backup and cloning schedules are not synchronized.

Embodiments herein synchronize backup and cloning schedules. A determination is made whether any session is running disk backup. For example, a backup application determines if a backup and recovery tool is in the process of storing any backup files. A determination is made whether a backup file is stored in a file recovery area if no session is running disk backup. For example, the backup application determines if any backup files are stored in the file recovery area after determining that the backup and recovery tool is not currently in the process of storing any backup files. A determination is made whether a successful clone copy was created of the backup file if the backup file is stored in the file recovery area. For example, the backup application determines if a clone copy has already been created for a backup file stored in a file recovery area. A clone copy of the backup file is created if a successful clone copy was not created of the backup file. For example, the backup application creates a clone copy of an incremental backup copy stored in the file recovery area because no clone copy has already been created of the incremental backup copy. The clone copy is stored on an external destination node. For example, the backup application stores the clone copy on an external disk. The backup application automatically synchronizes the backup and cloning schedules, ensuring that the clone copy is created of the backup file as soon as the backup file is stored in the file recovery area.

Figure 1:
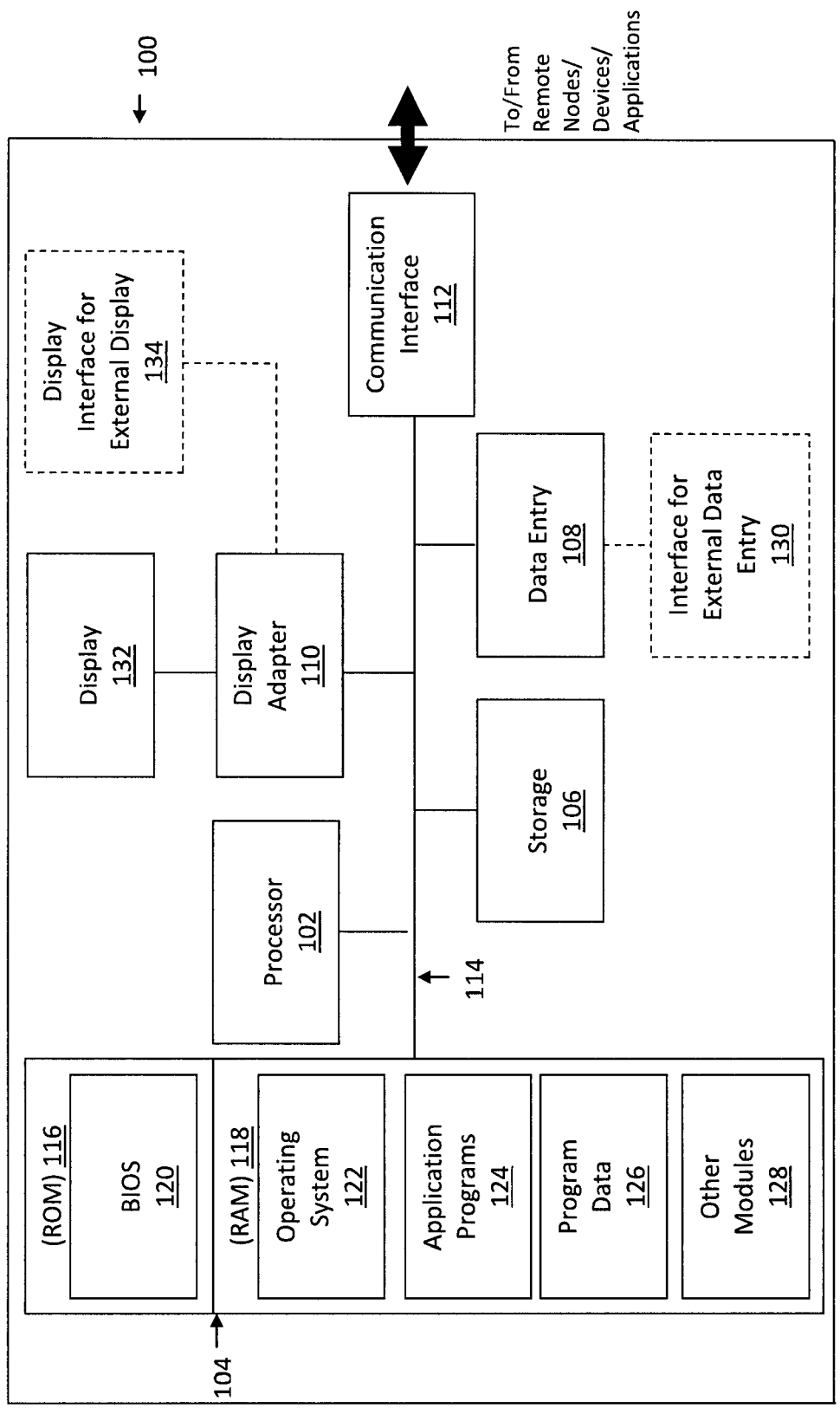
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as non-volatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for synchronizing backup and cloning schedules.

In the prior art, cloning copies of backup files may become tedious and failure prone for a backup administrator if backup and cloning schedules are not synchronized. Embodiments herein synchronize backup and cloning schedules. The backup application automatically synchronizes the backup and cloning schedules, ensuring that the clone copy is created of the backup file as soon as the backup file is stored in the file recovery area.

Figure 2:
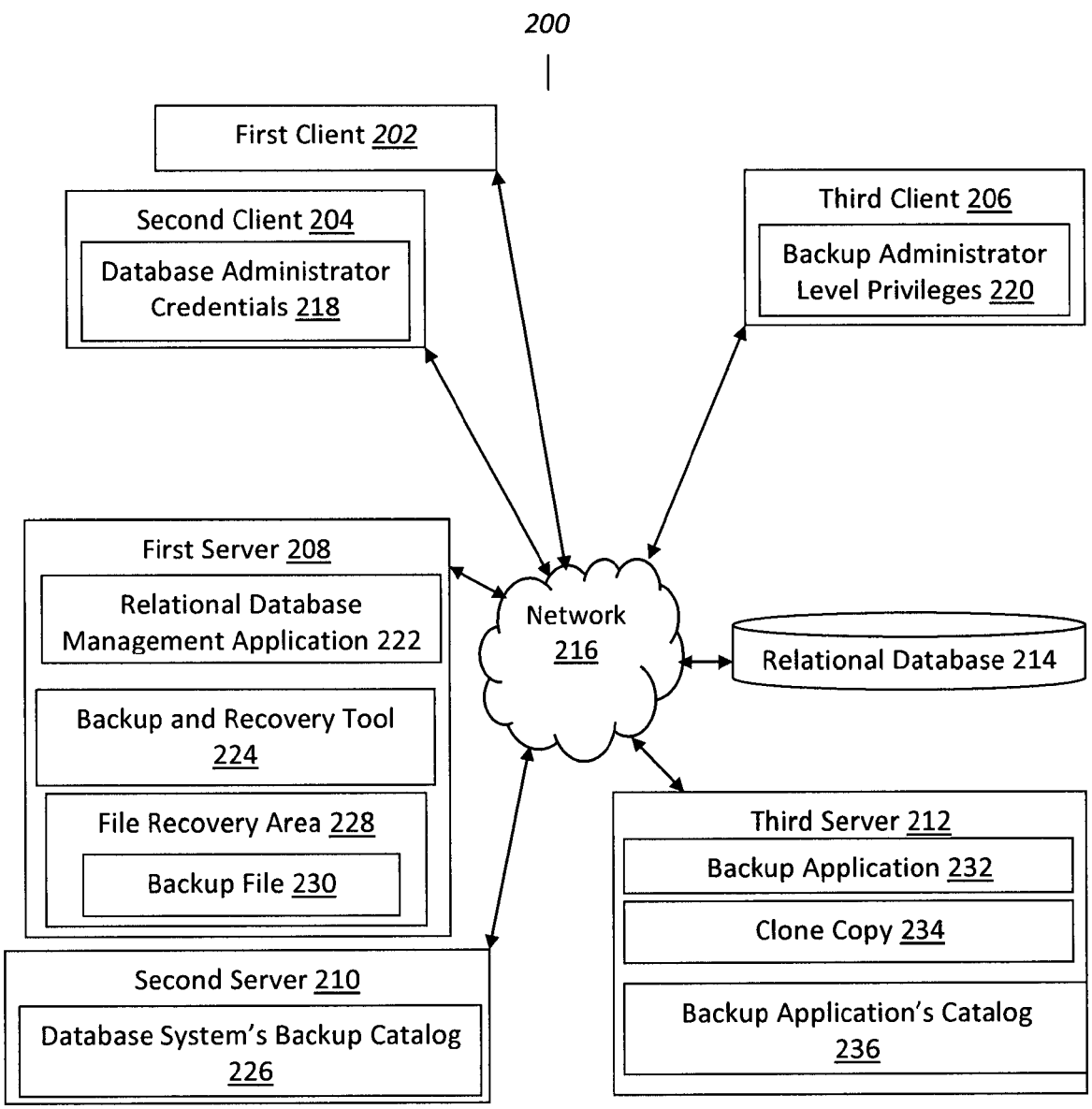
FIG. 2 illustrates a block diagram of an example system for synchronizing backup and cloning schedules, under an embodiment.

FIG. 2 illustrates a block diagram of a system that synchronizes backup and cloning schedules, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a first server 208, a second server 210, and a third server 212, that are provided by a hosting company. The first server 208 is associated with a relational database 214. The clients 202-206, the servers 208-212, and the relational database 214 communicate via a network 216. Although FIG. 2 depicts the system 200 with three clients 202-206, three servers 208-212, one relational database 214, and one network 216, the system 200 may include any number of clients 202-206, servers 208-212, relational databases 214, and networks 216. The clients 202-206 and the servers 208-212 may each be substantially similar to the system 100 depicted in FIG. 1.

The first client 202 enables a user to access a relation database management system as a system user. The second client 204 includes database administrator credentials 218 that enable a user to access the relation database management system as a database administrator. The third client 206 includes backup administrator level privileges 220 that enable a user to access a third-party backup application as a backup administrator. The first server 208 includes a relational database management application 222 that executes to implement the relation database management system, a backup and recovery tool 224 that manages backup and recovery for the relational database 214, and a file recovery area 228 that stores a backup file 230 that may be an image copy of data files or a proprietary format file that includes parts or all of multiple data files The second server 210 includes a backup catalog 226 that records activity of the backup and recovery tool 224 for at least one relational database 214. The third server 212 includes a backup application 232 that creates and recovers a clone copy 234 of the backup file 230, and a backup application's catalog 236.

FIG. 2 depicts the system elements 222, 224, 228, and 230 residing completely on the first server 208 and the system elements 232-236 residing completely on the third server 212. However, the system elements 222, 224, 228, and 230 may reside in any combination of partially on the first server 208 and partially on other servers that are not depicted in FIG. 2. Similarly, the system elements 232-236 may reside in any combination of partially on the third server 212 and partially on other servers that are not depicted in FIG. 2.

The backup application 232 determines whether any session is running disk backup. For example, the backup application 232, such as a NetWorker® backup application, queries a database system's dynamic views to determine if the backup and recovery tool 224 is in the process of storing the backup file 230 for the relational database 214 into the file recovery area 228, which may reside on a disk that is internal to the relational database management system, such as a disk associated with the second server 220.

EMC Corporation's NetWorker® backup application is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Oracle. Client backup data can be sent to a remote NetWorker® storage node or stored on a locally attached device by the use of a dedicated storage node. EMC Corporation's NetWorker® modules for Databases and Applications supports cross platform products such as Oracle and IBM DB2.

The backup application 232 determines whether the backup file 230 is stored in the file recovery area 228 if no session is running disk backup. For example, the backup application 232 queries a backup catalog view associated with the backup and recovery tool 224 to determine if any backup file 230 is already stored in the file recovery area 228 because the backup and recovery tool 224 is not currently in the process of storing any backup file 230 in the file recovery area 228. The backup application 232 determines a successful clone copy was created of the backup file 230 if the backup file 230 is already stored in the file recovery area 228. For example, the backup application 232 determines if any clone copy has already been created for the backup file 230 stored in a file recovery area 228. This determination may be based on a comparison between the time that the backup file 230 was stored in the file recovery area 228 and the time that the most recent successful clone copy was created of any backup file stored in the file recovery area 228. At this point, the backup application 232 may identify that the new backup file 230 is stored in the file recovery area 228 just as soon as the backup and recovery tool 224 has stored the new backup file 230 in the file recovery area 228, such that the time has arrived for the backup application 232 to create the clone copy 234 of the backup file 230.

The backup application 232 creates the clone copy 234 of the backup file 230 if no successful clone copy 234 was created of the backup file 230. For example, the backup application 232 creates the clone copy 234 of the new incremental backup copy 230 of changes to human resources data stored in the relational database 214. The clone copy 234 may be the full backup file 230 or the incremental backup file 230.

The backup application 232 stores the clone copy 234 on an external destination node. For example, the backup application 232 stores the clone copy 234 on a disk associated with the third server 212, thereby protecting the clone copy 234 of the incremental backup file 230 even if the relational database 214 and/or the incremental backup file 230 stored on a disk associated with the second server 210 is corrupted. The external destination node, such as the third server 212, may include multiple destination nodes, and the multiple destination nodes may include a disk destination node, a tape destination node, and/or a destination node that is a combination of disks and tapes. For example, the backup application 232 may store the clone copy 234 on a disk, on a tape, or partly on a disk and partly on a tape associated with the third server 212. A backup administrator may access the backup application 232 via the third client 206 to specify a priority for storing the clone copy 234 on the external destination nodes, such as storing only on disks, or storing on disks before storing on a combination of disks and tapes. Additionally, a backup administrator may use the backup application 232 to specify the options for the clone copy 234 to be encrypted, deduplicated, and/or compressed while being transmitted from a source, and the options for the clone copy 234 to be decrypted and/or decompressed when stored on an external destination node. Data deduplication significantly reduces cloning time by only storing unique daily changes, while always maintaining daily clone copies of full backup files for an immediate single-step restore. The transmission of deduplicated clone copies sends only changed blocks, thereby reducing network traffic.

The backup application 232 may receive a request to recover the clone copy 234. For example, the backup application 232 receives a request from the backup and recovery tool 224 to recover the clone copy 234 stored on a disk associated with the third server 212. The backup application 232 may recover the clone copy 234 from the external destination node. For example, the backup application 232 recovers the clone copy 234 from a disk associated with the third server 212. The backup application 232 may enable the backup and recovery tool 224 to restore the recovered clone copy 234 to the relational database 214. For example, the backup application 232 sends the recovered clone copy 234 to the backup and recovery tool 224 to restore the corrupted relational database 214. A database administrator may also select to execute a manual rollback to restore the relational database 214 based on a certain checkpoint selected by the database administrator.

The backup and recovery tool 224 may typically select to restore the relational database 214 from the backup file 230 stored on the disk associated with the second server 210. However, if the backup and recovery tool 224 determines that the backup file 230 stored on the disk associated with the second server 210 is corrupted or absent, the backup and recovery tool 224 may request to recover the clone copy 234 from the disk associated with the third server 212, and may restore the clone copy 234 to the corrupted relational database 214. Even if the backup and recovery tool 224 requests to recover the clone copy 234 from the disk associated with the third server 212, a database administrator requesting the recovery via the second client 204 participates in a single step recovery process, as the database administrator does not have to request assistance from the backup administrator, or request the separate loading of any storage medium used for long-term data retention, such as a tape storage. The backup application 232 automatically synchronizes the backup and cloning schedules, ensuring that the clone copy 234 is created of the backup file 230 as soon as the backup file 230 is stored in the file recovery area 228.

Figure 3:
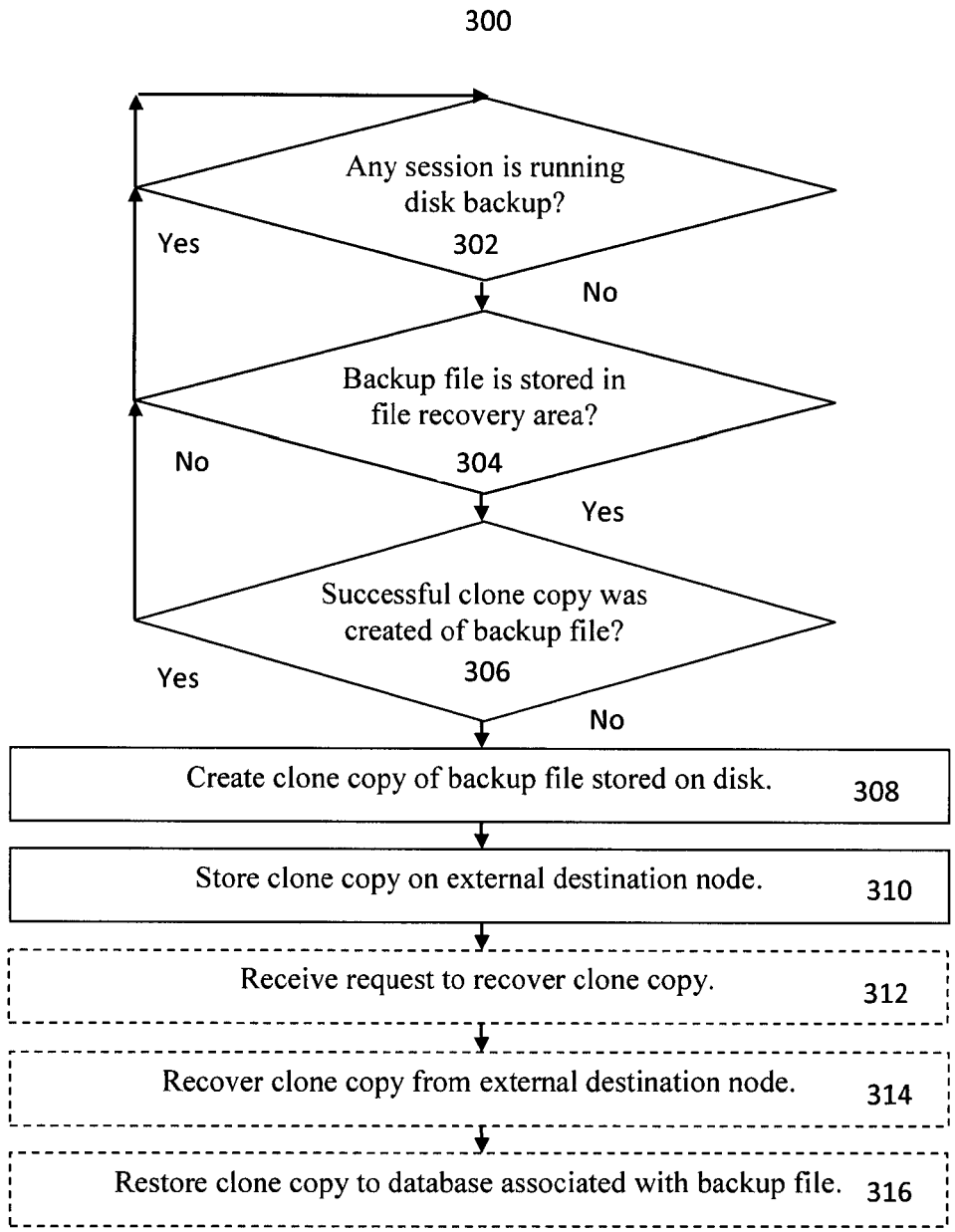
FIG. 3 is a flowchart that illustrates a method of synchronizing backup and cloning schedules, under an embodiment.

FIG. 3 is a flowchart that illustrates a method of synchronizing backup and cloning schedules. Flowchart 300 illustrates method acts illustrated as flowchart blocks for certain steps involved in and/or between the clients 202-206 and/or the servers 208-212 of FIG. 2.

A determination is made whether any session is running disk backup, act 302. For example, the backup application 232 determines if the backup and recovery tool 224 is in the process of storing any backup file 230 in the file recovery area 228. If any session is running disk backup, the flowchart 300 resets to monitor at a later time whether any new backup file has been stored to disk. If no session is running disk backup, the flowchart 300 continues to act 304.

A determination is made whether a backup file is stored in a file recovery area, act 304. For example, the backup application 232 determines if the backup file 230 is stored in the file recovery area 228. If no backup file is stored in a file recovery area, the flowchart 300 resets to monitor at a later time whether any new backup file has been stored to disk. If any backup file 230 is stored in the file recovery area 228, the flowchart 300 continues to act 306.

A determination is made whether a successful clone copy was created of the backup file, act 306. For example, the backup application 232 determines if the clone copy 234 has already been created for the backup file 230 stored in the file recovery area 228. If a successful clone copy 234 was already created of the backup file 230, the flowchart 300 resets to monitor at a later time whether any new backup file 230 has been stored to disk. If no successful clone copy 234 was created of the backup file 230, the flowchart 300 continues to act 308.

A clone copy of a backup file is created, act 308. For example, the backup application 232 creates the clone copy 234 of the incremental backup copy 230.

A clone copy is stored on an external destination node, act 310. For example, the backup application 232 stores the clone copy 234 on a disk associated with the third server 212.

A request is optionally received to recover the clone copy, act 312. For example, the backup application 232 receives a request from the backup and recovery tool 224 to recover the clone copy 234 stored on a disk associated with the third server 212.

A clone copy is optionally recovered from an external destination node, act 314. For example, the backup application 232 recovers the clone copy 234 from the disk associated with the third server 212.

A clone copy is optionally restored to a database associated with a backup file, act 316. For example, the backup application 232 sends the clone copy 234 to the backup and recovery tool 224 to restore the clone copy 234 to the corrupted relational database 214.

Although FIG. 3 depicts the acts 302-316 occurring in a specific order, the acts 302-316 may occur in another order. Executing the flowchart 300 synchronizes backup and cloning schedules. The backup application 232 automatically synchronizes the backup and cloning schedules, ensuring that the clone copy 234 is created of the backup file 230 as soon as the backup file 230 is stored in the file recovery area 228.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for synchronizing backup and cloning schedules, the system comprising:
   a processor-based application executed on a computer and configured to:
   determine whether any session is running disk backup for a remotely-located database for a database system by querying a dynamic view of a backup and recovery tool of the database system and determining if the backup and recovery tool of the database system is in process of storing a backup file into a file recovery area;
   determine, in response to a determination that no session is running disk backup, whether a backup file for the remotely-located database is stored in a file recovery area and is pending verification of whether the backup file requires cloning by querying a backup catalog view associated with the backup and recovery tool;
   determine, in response to a determination that the backup file is stored in the file recovery area and is pending verification of whether the backup file requires cloning, whether a current clone copy of the backup file stored in the file recovery area has been successfully created by comparing a time when the backup file was stored in the file recovery area with a time when a most recent successful clone copy was created of any backup file stored in the file recovery area, the most recent successful clone copy being stored on an external destination node that is external to the database system backed up by the backup file;
   create, in response to a determination by the comparison of storage times indicating that the current clone copy was not successfully created of the backup file, the current clone copy of the backup file based on the backup file stored in the file recovery area; and
   store the current clone copy on the external destination node.

2. The system of claim 1, wherein the backup file comprises one of a full backup file and an incremental backup file.

3. The system of claim 1, wherein the external destination node comprises at least one of an external disk and a tape.

4. The system of claim 1, wherein the processor-based application is further configured to
   receive a request to recover the current clone copy;
   recover the current clone copy from the external destination node; and
   restore the current clone copy to a database associated with the backup file.

5. The system of claim 1, wherein the file recovery area resides on a disk.

6. A computer-implemented method for synchronizing backup and cloning schedules, the method comprising:
   determining whether any session is running disk backup for a remotely-located database for a database system by querying a dynamic view of a backup and recovery tool of the database system and determining if the backup and recovery tool of the database system is in process of storing a backup file into a file recovery area;
   determining, in response to a determination that no session is running disk backup, whether a backup file for the remotely-located database is stored in a file recovery area and is pending verification of whether the backup file requires cloning by querying a backup catalog view associated with the backup and recovery tool;

determining, in response to a determination that the backup file is stored in the file recovery area and is pending verification of whether the backup file requires cloning, whether a current clone copy of the backup file stored in the file recovery area has been successfully created by comparing a time when the backup file was stored in the file recovery area with a time when a most recent successful clone copy was created of any backup file stored in the file recovery area, the most recent successful clone copy being stored on an external destination node that is external to the database system backed up by the backup file;

creating, in response to a determination by the comparison of storage times indicating that the current clone copy was not successfully created of the backup file, the current clone copy of the backup file based on the backup file stored in the file recovery area; and storing the current clone copy on the external destination node.

7. The method of claim 6, wherein the backup file comprises one of a full backup file and an incremental backup file.

8. The method of claim 6, wherein the external destination node comprises at least one of an external disk and a tape.

9. The method of claim 6, wherein the method further comprises:

receiving a request to recover the current clone copy;

recovering the current clone copy from the external destination node; and restoring the current clone copy to a database associated with the backup file.

10. The method of claim 6, wherein the file recovery area resides on a disk.

11. A computer program product, comprising a non-transitory computer-readable medium having a computer-readable program code embodied therein, the computer-readable program code adapted to be executed by one or more processors to implement a method for synchronizing backup and cloning schedules, the method comprising:

determining whether any session is running disk backup for a remotely-located database for a database system by querying a dynamic view of a backup and recovery tool of the database system and determining if the backup and recovery tool of the database system is in process of storing a backup file into a file recovery area;

determining, in response to a determination that no session is running disk backup, whether a backup file for the remotely-located database is stored in a file recovery area and is pending verification of whether the backup file requires cloning by querying a backup catalog view associated with the backup and recovery tool;

determining, in response to a determination that the backup file is stored in the file recovery area and is pending verification of whether the backup file requires cloning, whether a current clone copy of the backup file stored in the file recovery area has been successfully created by comparing a time when the backup file was stored in the file recovery area with a time when a most recent successful clone copy was created of any backup file stored in the file recovery area, the most recent successful clone copy being stored on an external destination node that is external to the database system backed up by the backup file;

creating, in response to a determination by the comparison of storage times indicating that the current clone copy was not successfully created of the backup file, the current clone copy of the backup file based on the backup file stored in the file recovery area; and storing the current clone copy on the external destination node.

12. The computer program product of claim 11, wherein the backup file comprises one of a full backup file and an incremental backup file.

13. The computer program product of claim 11, wherein the external destination node comprises at least one of an external disk and a tape.

14. The computer program product of claim 11, wherein the method further comprises:

receiving a request to recover the current clone copy;

recovering the current clone copy from the external destination node; and restoring the current clone copy to a database associated with the backup file.

\* \* \* \* \*